United States Patent [19]

Herscovici

[11] Patent Number: 4,920,017
[45] Date of Patent: Apr. 24, 1990

[54] POROUS AND POROUS-NONPOROUS COMPOSITES FOR BATTERY ELECTRODES

[75] Inventor: Calman Herscovici, Chappaqua, N.Y.

[73] Assignee: Electric Power Research Institute, Inc., Palo Alto, Calif.

[21] Appl. No.: 275,219

[22] Filed: Nov. 23, 1988

Related U.S. Application Data

[62] Division of Ser. No. 934,168, Nov. 20, 1986, Pat. No. 4,818,741.

[51] Int. Cl.⁵ .................... H01M 4/86; B01J 21/18
[52] U.S. Cl. ......................................... 429/42; 502/180
[58] Field of Search .......................... 429/42; 502/180

[56] References Cited

U.S. PATENT DOCUMENTS

| | | |
|---|---|---|
| 4,162,351 | 7/1979 | Putt et al. . |
| 4,214,969 | 7/1980 | Lawrance . |
| 4,370,284 | 1/1983 | Soloman ........................ 502/101 X |
| 4,506,028 | 3/1985 | Fukuda et al. .................... 424/44 X |
| 4,551,267 | 11/1985 | Fushimi et al. . |
| 4,758,473 | 7/1988 | Herscovici et al. . |

OTHER PUBLICATIONS

Chem. Abstracts 101:233256g, 1984.
Chem. Abstracts 101:233257h, 1984.

*Primary Examiner*—Stephen J. Kalafut
*Attorney, Agent, or Firm*—Flehr, Hohbach, Test, Albritton & Herbert

[57] ABSTRACT

Novel porous and porous/nonporous composites useful as electrodes in electrochemical cells and methods for making same are provided. The porous composites comprise a pressure-molded composite of carbon particles and thermoplastic resin particles which have a particle size distribution of 0 to 45 $\mu$m. The pores are formed by dry mixing a water-leachable salt with a pore size distribution of 5 to 200 $\mu$m with the carbon and resin mixture and water extracting the salt to form the porous composite.

5 Claims, 2 Drawing Sheets

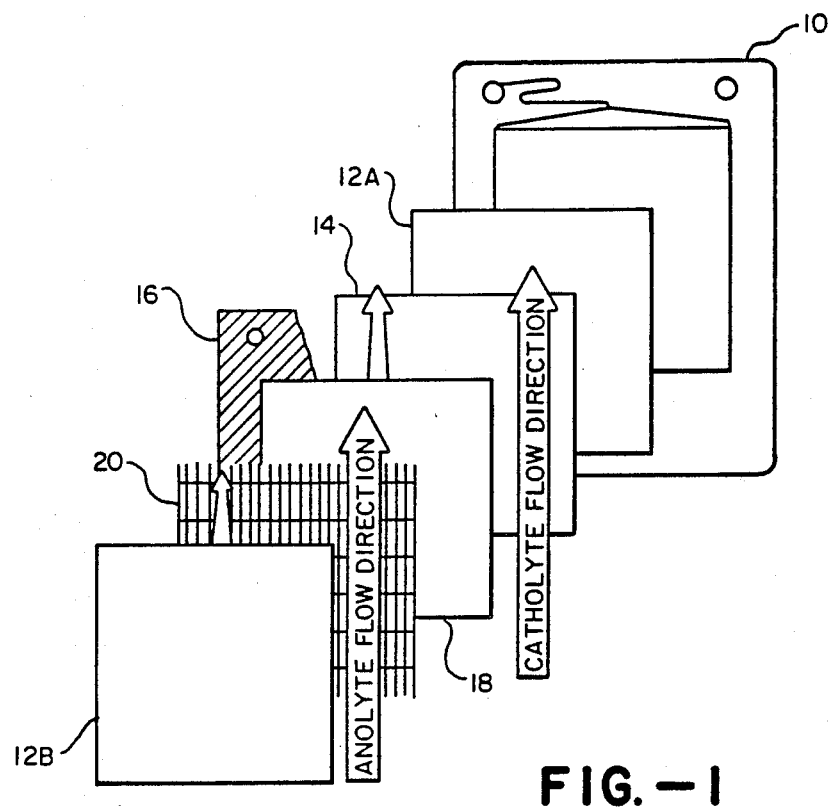
FIG.—1
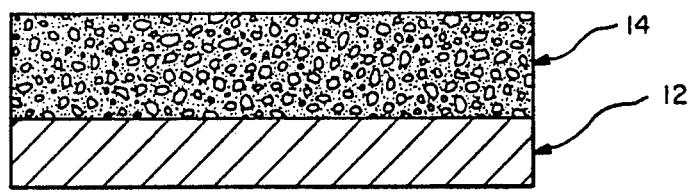
FIG.—2

POROUS AND POROUS-NONPOROUS COMPOSITES FOR BATTERY ELECTRODES

This is a division, of application Ser. No. 934,168 filed Nov. 20, 1986 now U.S. Pat. No. 4818741.

The present invention is directed to pressure molded porous electrodes for electrochemical cells, and more particularly for zinc bromide electrochemical cells.

BACKGROUND OF THE INVENTION

There has been great interest in the development of a zinc bromide battery as an energy storage device because of the potential for its simplicity of design, high theoretical voltage, and low cost of reactants. In such a battery the energy is stored by electrolyzing an aqueous zinc-bromide cell on charge to form zinc metal and bromine liquid. During charge bromine is evolved at the cathode and dissolved in the electrolyte while zinc metal is deposited on the anode. On discharge the two reactants are consumed to form zinc bromide.

An exemplary zinc bromide battery consists of a stack of flow frame assemblies wherein a carbon bipolar electrode is bonded into each frame. The flow channels in the frames direct electrolyte past the anode and cathode side of each electrode. One side of each electrode is usually a flat surface on which zinc is deposited and consumed while the other side of the electrode may comprise a carbon felt to support the bromine evolution and consumption reactions. A porous separator is maintained between the positive and negative sides of the adjacent electrodes to prevent bromine from diffusing from the positive electrolyte to the negative electrolyte, each of which is maintained in a separate flow system.

During charge of the battery a method of storage is required to remove generated bromine from the catholyte, to avoid increase in bromine concentration to levels of self-discharge and corrosion of cell components. Thus, bromine is stored as a complex with a quaternary ammonium bromide salt so that up to four bromine molecules can reversibly complex with the salt. The unbrominated quaternary salt is soluble in aqueous electrolyte while the polybromide complex is insoluble and separates out in a heavier oil-like phase. The organic complexing agent flows in a separate flow loop and is not pumped through the cell stack. Contact between the catholyte and complexing agent is accomplished by dispersing the complexing agent into droplets in a mixer external to the cell stack, thus increasing the area for bromine transfer between the two phases. An exemplary zinc bromide battery stack utilizing this system is disclosed in U.S. Pat. No. 4,162,351.

It is, however, desirable to scale up current zinc bromide technology to meet costs and performance requirements on a large scale, as for example for a power utility load leveling mission. To meet these requirements it is important to improve not only the efficiency of the design of the battery but also to improve the system lifetime, and in particular the lifetime of components which are subjected to particularly stressful conditions. One of these components is the bromine electrode, which includes the cathode side of the bipolar electrode. The flat surface of the cathode side of the bipolar plate may be used alone as the cathode, however, in order to provide an efficient battery this configuration requires high bromine concentration in the catholyte in order to reduce or avoid the effects of concentration polarization. Therefore, normally a high surface are material such as a carbon felt, in contact with the cathode surface of the bipolar electrode, is utilized to provide more surface area to support the $Br_2/Br^-$ reaction. The felt material is usually made of electrically conductive carbon and may also incorporate an insoluble stable catalyst to either enhance the $Br_2/Br^-$ reaction or to reduce activation polarization.

U.S. Pat. No. 4,235,695 discloses porous electrodes made of vitreous or glassy carbon forming a porous body with a coating containing an electrocatalytic agent. The porous vitreous carbon material is prepared by infusing polyurethane resin strands with a curable furan resin. The furan is polymerized then rapid heating carbonizes the structure to form a porous vitreous carbon. As disclosed, the carbon structures provide a density of between about 0.03 and 0.08 gm/cc. In the examples glassy carbon structures are disclosed having a porosity of about 70% and 45%.

U.S. Pat. No. 4,505,992 discloses porous gas distribution plate assemblies for fuel cells, which include an inner impervious region. The porous plates are disclosed as being. vitreous carbon needled-felt plates, or graphite plates having pore sizes in the range of 0.1 to 1.0 mm, 0.01 to 0.1 mm, and 0.001 to 0.001 mm, respectively, in size Bipolar current collector-separators for electrochemical cells containing graphite and thermoplastic fluoropolymers are disclosed in U.S. Pat. Nos. 4,214,969 and 4,339,332. A bipolar plate substrate for electrochemical cell containing glassy carbon and a plastic such as polyvinylidene fluoride homopolymer is disclosed in U.S. Pat. No. 4,098,967. The above patents, however, are not directed to bipolar electrodes which meet the requirements of low cost, durability, and good electrical performance in a zinc bromide battery for large industrial application.

It is therefore an object of the present invention to provide novel porous electrodes which have improved stability to a stringent electrochemical cell environment, particularly to a zinc-bromide cell environment.

It is a further object of the present invention to provide novel porous electrodes which may be scaled up to large industrial applications while maintaining or improving physical strength, chemical stability to electrochemical cell environment, electrical performance, and component longevity.

It is another object of the present invention to provide a method for manufacturing improved porous electrodes for electrochemical cells.

It is yet another object of the present invention to provide an assembly of a pressure-molded porous composite and nonporous composite for use in electrochemical cells.

These and other objects will become apparent from the following description and appended claims.

SUMMARY OF THE INVENTION

Novel porous electrode elements for electrochemical cells are provided as well as methods for producing same. The porous electrode elements comprise a pressure-molded porous composite comprising electrically conductive carbon and a thermoplastic resin. The carbon and resin are in a weight ratio of about 1:5 to 1:1 and the composite is characterized by a 80–95% porosity volume and a pore size diameter distribution from about 5 microns to about 200 microns.

An assembly is also provided comprising the above described porous element pressure-molded onto a nonporous carbon composite of similar composition.

BRIEF DESCRIPTION OF THE DRAWINGS

In the accompanying figures:

FIG. 1 is a battery design shown schematically incorporating the porous electrode substrates according to the present invention.

FIG. 2 illustrates a porous/nonporous composite in accordance with one embodiment of the invention.

DESCRIPTION OF THE INVENTION

Figure 3:
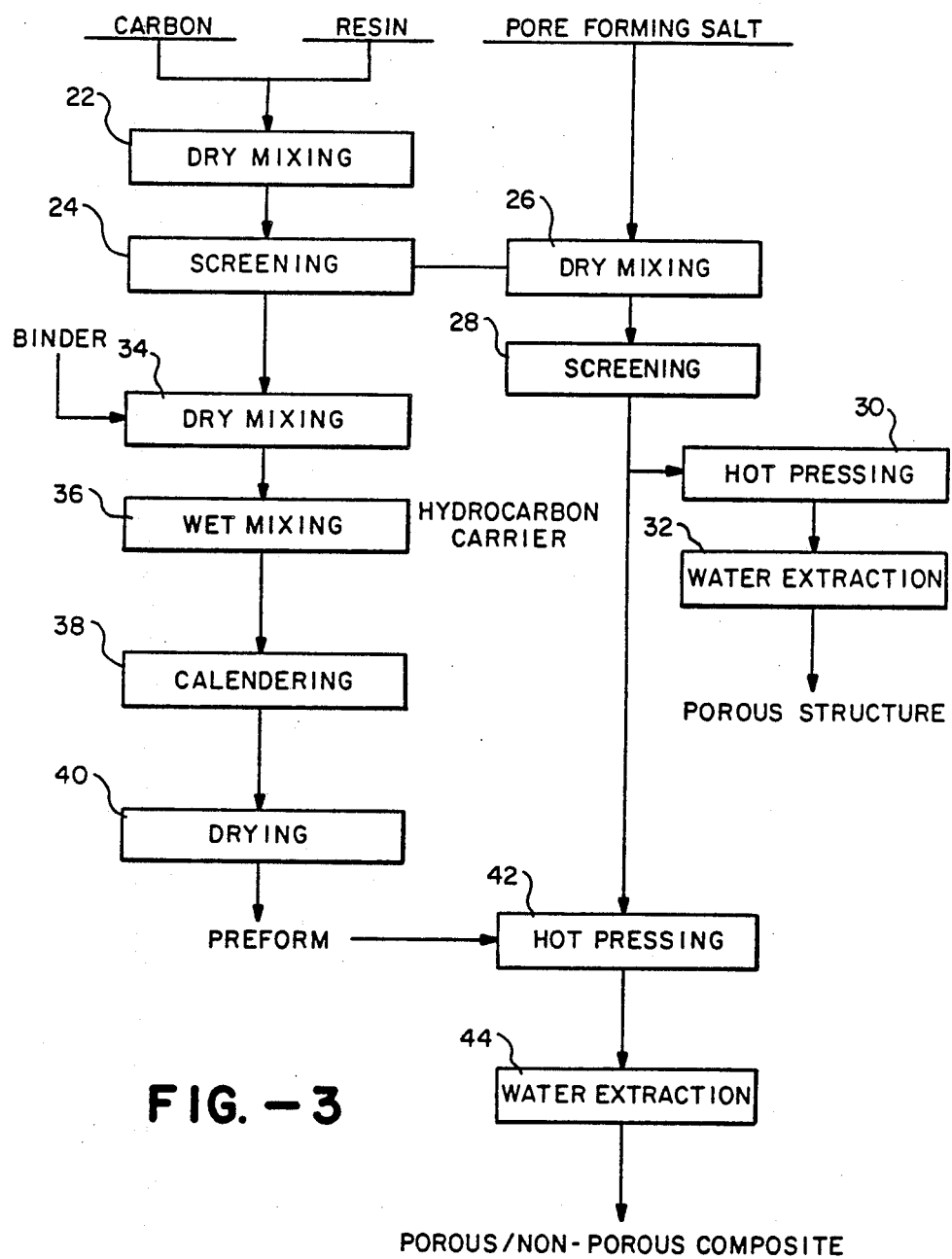
FIG. 3 is a flowchart illustrating the manufacturing process for porous and nonporous composites according to the present invention.

In accordance with the invention, a pressure-molded porous electrode element is provided which is a composite of an electrically conductive carbon, such as carbon black, graphite or mixtures thereof, and a thermoplastic resin. The carbon and the resin are provided in particulate form prior to the pressure molding such that all of the particles have a size distribution of 0 to 45μm. The final porous composite will have a porosity of 80 to 95% by volume and a pore size diameter distribution from about 5 microns to about 200 microns.

In one embodiment of the invention a porous/nonporous composite is provided wherein the non-porous portion of the composite also comprises electrically conductive carbon and a thermoplastic resin, with the carbon and the resin in the non-porous portion of the composite also being present in a weight ratio of about 1:5 to 1:1.

Various techniques for making porous carbon composites are known, such as by impregnation of polyurethane resins strands with a volatile and/or decomposable compounds, impregnation of graphite with volatile salts such as ammonium chloride or with other compounds capable of decomposing to give gaseous products such as hydrazine. However, the resulting structures will often suffer from low mechanical strength, many flaws and nonuniformity. According to the present invention the critical porous structure is provided by a water leachable salt initially mixed with the dry carbon and resin prior to pressure molding. The particular mixture of the carbon and resin along with the porosity obtained by the present invention are critical to maintaining not only the desired strength and chemical stability but also in maintaining the required electrical performance of these components.

One component of the porous and non-porous portions of the composites according to the present invention is a carbon having a particle size distribution of 0 to 45μm. The carbon may be selected from carbon black, graphite or mixtures thereof. It is also desirable that, if graphite is used, that the graphite be heat treated at a temperature of at least 800° prior to being molded into the composite. Carbon black or graphite meeting the above characteristics of particle size distribution are commercially available from Asbury Graphite Mills, Inc. (Asbury, N.J.).

The thermoplastic resin particles may be a thermoplastic fluoropolymer, and in particular a polyvinylidene difluoride. Fluoropolymer resins such as tetrafluoropolyethylene, and the like, are commercially available and may be utilized in place of polyvinylidene difluoride although the polyvinylidene difluoride is preferable. A suitable polyvinylidene difluoride is available under the trade name Kynar, from PennWalt Corporation. The particle size distribution of the thermoplastic resin particles is also critical, and have a particle size distribution in the range of about 0 to 45μm.

To form the porous composite, the carbon particles will be dry mixed with the thermoplastic resin particles and water-soluble salt and compression molded into a composite. Molding conditions will usually be 400 kg/cm² or higher pressure at 190° C. with gradual cooling. The salt is then leached by water extraction to form the porous structure. Other alternate and preferred embodiments for preparing composites will be described hereinbelow in connection with FIG. 3

The composite will contain carbon particles and resin particles in the weight ratio of 1:5 to 1:1. The preferred weight ratio is 1:1.

To form the porous composite the weight ratio of the non-salt components (the carbon particles and resin particles, optionally with a small amount of a mold releasing agent) to water leachable salt will be in the range of about 1:7 to 1:8. A preferred ratio is from 1:7.5 to 1:7.8.

The types of water leachable salts which may be utilized include ammonium salts, such ammonium sulfate, ammonium chloride; sodium chloride, lithium chloride, potassium chloride, potassium sulfate, sodium nitrate, and the like. The preferred salt is ammonium chloride. The salt particles are of a size suitable to meet the pore size requirements for the cell component. Preferably the salt particles will have a size distribution of from 5 to 200μm.

In one embodiment of the present invention, the porous composite may be formed into an assembly with a nonporous carbon composite. The dry mixture to be formed into the non-porous portion of the assembly will comprise the same materials as used to form the porous portion except that there will be no salt. The carbon and resin will be mixed optionally with a small amount of a mold releasing agent (such as fluorohydrocarbon such as Teflon ®), mixed with a volatile hydrocarbon carrier and calendered into sheet preforms. After drying of the solvent, the preform will be placed into the mold and the dry mixture of the carbon, resin and salt will be placed over or under the preform. The preform together with the dry mixture is then pressure molded. After water extraction of the assembly the preform will form the non-porous portion of the assembly and the dry mixture now compression molded, will form the porous portion of the assembly.

Further detail of preferred embodiments of the invention will be described in connection with the attached figures.

Referring to FIG. 1 there is shown a schematic exploded view diagram of a cell component of an electrochemical battery for use of zinc bromide technology. Frame 10 is a typical flow frame showing the positive side of the frame which is utilized to hold cell components. Flow frame 10 is usually made from heat and chemical resistant injection molded material such as polypropylene. Bipolar electrode 12A may be a separate component or may be co-molded with the porous cathode substrate 14 in accordance with the present invention. The assembly of the bipolar electrode 12A and carbon cathode substrate 14 comprises a preferred assembly according to the present invention. Alternatively, a conventional bipolar plate 12A may be used and bonded to a porous cathode substrate 14 made according to the invention. Adjacent to the cathode substrate 14 is the catholyte flow. Then partially shown is a filled gasket 16 area of the separator followed by the separator membrane 18. Bonded to separator membrane 18 is the anode grid spacer 20, which is adjacent to a space for the flow of anolyte. Finally, there is the bipolar electrode 12B for the next adjacent cell, with the cell stack continuing, depending upon the number of cells desired in the battery stack.

The porous cathode substrate 14 will be 80-95% porous.

Referring to FIG. 2, there is illustrated a porous/nonporous assembly which forms a bipolar electrode and cathode substrate according to the present invention. This is a detailed view of the assembly of the non-porous bipolar electrode 12 with the porous substrate 14.

Referring to FIG. 3 there is illustrated a flowchart for preparing the porous and porous/nonporous composites according to the present invention. To prepare only a porous composite, the carbon and resin particles are dry mixed in step 22, and then screened in step 24 to ensure that the particle size distribution of the carbon and resins are in the range of 0 to 45$\mu$m. Then the pore forming salt is dry mixed with this mixture in step 26 and the entire mixture again is screened in step 28 to ensure that the salt particles are the size to meet the pore requirements of the porous components. The entire mixture is then compression molded in step 30, usually under conditions of at least 400 kg/cm$^2$ at 190° C. with cooling in a conventional compression mold apparatus. The molded composite is then extracted with water in step 32 to leach out the pore forming salt to form the porous structure.

Still referring to FIG. 3, to form the porous/nonporous assembly according to the present invention, the carbon and resin are mixed and screened as described above then mixed with a small amount (about 2% by weight of the mixture) of a binder and/or releasing agent such as, a perfluorohydrocarbon in step 34. Teflon® is the preferred binder-mold releasing agent. Then the carbon-resin-binder mixture is wet mixed with a suitable hydrocarbon carrier in step 36, such as Solvent 340 (Shell) then calendered in step 38 into sheet preforms. After drying the sheets in step 40 the preform is placed into a compression mold and molded in step 42 with a layer of the dry mixture of salt, carbon, and resin resulting from step 28 described above. After water extraction in step 4 a molded porous/nonporous composite is formed as exemplified in FIG. 2.

The following example is provided by way of illustration and is not intended to limit the invention in any way.

EXAMPLE 1

A mixture of 250 gms of polyvinylidene difluoride, sold under the name of Kynar by the PennWalt Corporation, and 250 gms of graphite, (artificial) sold under the name of A-99 by Asbury Graphite Mills, Inc., were dry mixed and screened through a 325 mesh screen to ensure the particle size distribution of 0 to 45$\mu$m. Then 450 gms of this mixture were separated and mixed with 8 gms of Teflon® and wet mixed with 250 mls. of a hydrocarbon carrier. The wet mixture was calendered using 2 rollers to form sheets. The sheets were dried at 20° C. for 168 hours, then placed into compression mold. A second portion (12 gms) of the dry graphite-polyvinylidene difluoride mixture was mixed with 88 gms of ammonium chloride, then the mixture was screened through a 325 mesh screen to ensure a particle size distribution of 0 to 45$\mu$m. Then 18 gms of this carbon-resin-salt mixture were poured onto the sheet described above and the entire assembly was molded into a 4 by 4 inch plate under 400 kg/cm$^2$ pressure at 190° C. with cooling during the compression. The formed plates had a compressed thickness of 80 mils, with 40 mils of this thickness comprising the porous portion. The plate was then extracted with water at 20° C. for 16 hours and dried to form the porous/nonporous composite suitable for use as a bipolar electrode in a zinc bromide electrochemical cell.

EXAMPLE 2

A mixture of carbon-resin-ammonium chloride which was screened as described above, was poured into a mold and pressure molded under 400 kg/cm$^2$ pressure at 190° C. with cooling during the compression. Upon extraction of this mixture with water at 20° C. for 16 hours a porous cathode substrate was formed suitable for use in a zinc bromide electrochemical cell.

I claim:

1. In a zinc-bromide electrochemical cell, the improvement comprising a cathode element comprising a pressure-molded porous composite comprising electrically conductive particulate carbon selected from the group consisting of carbon black, graphite and mixtures thereof having a particle size distribution of 0 to 45$\mu$m and a thermoplastic resin, said carbon and said resin being in a weight ratio from about 1:5 to 1:1; said composite characterized by 80-95% porosity by volume and a pore size diameter distribution from about 5 microns to about 200 microns.

2. An electrochemical cell according to claim 1 further comprising a catalyst for catalyzing reduction of the catholyte.

3. An electrochemical cell according to claim 1 wherein said resin comprises polyvinylidene difluoride.

4. An electrochemical cell according to claim 1 further comprising a pressure-molded nonporous composite in contact with said porous composite, said nonporous composite comprising electrically conductive particulate carbon selected from the group consisting of carbon black, graphite and mixtures thereof having a particle size distribution of 0 to 45$\mu$m and thermoplastic resin, said carbon and said resin in said nonporous composite being present in a weight ratio of about 1:5 to 1:1.

5. An electrochemical cell according to claim 4 wherein said nonporous composite comprises polyvinylidene difluoride.

* * * * *